Patented Aug. 4, 1936

2,049,563

UNITED STATES PATENT OFFICE 2,049,563

PROCESS OF TREATING FRUIT

Rodney B. Harvey, St. Paul, Minn., assignor, by mesne assignments, to Food Machinery Corporation, San Jose, Calif.

No Drawing. Application October 20, 1932, Serial No. 638,780

2 Claims. (Cl. 99—103)

The principle of the invention is herein explained, and the best mode in which I have contemplated applying that principle so as to distinguish it from other inventions is as follows.

Fruit as picked from the tree, and particularly citrus fruit, is prone to be dusty and infested with mold spores, smut or soot and scale, besides being lacking in desirable color. As well known, the maturity of the fruit for picking is gauged not by the color, but by tests for maximum acid content of the juice, prescribed by governmental regulating authorities, State and Federal, and while cold weather normally assists in removing the green chlorophyll and allows the golden color to show up, this cannot always be relied upon. It is also well known that perfectly mature fruit which has also had opportunity to naturally color up on the tree will often, if the tree receive any stimulation, such as cultivation, fertilization, irrigation, etc., revert to a green color. Since the ultimate consumer looks to the color rather than the chemical maturity, efforts have been made to attain desirable coloration, insofar as possible, and it having been found that ethylene gas has a blanching action on green colored mature fruit, the practice has largely come into vogue of exposing the fruit to such gas in order to destroy remaining chlorophyll. Since the action of the gas is governed by conditions such as temperature, humidity, etc., results in practice lack the uniformity that is desired. Unfortunately also, this treatment has a tendency not only to destroy the chlorophyll, but also the orange colored pigment, and fruit so treated tends to have a pale yellow unattractive color lighter than normal. I have now found that by applying suitable treating agents to whole citrus fruit, the natural varietal color of the fruit may be enhanced. Furthermore, a complete cleaning, sterilizing, coloring, drying, and polishing, and marking of damaged fruit for inspection and discard, may be accomplished all together.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be applied.

In accordance with my invention, I prepare an oleaginous agent, preferably in emulsion with water. Such fundamental agent may be a suitable mineral, vegetable or animal oil, preferably a mineral oil, and this may be emulsified, as by a fatty acid or soap-like emulsifier, for instance oleic acid and a reactive base, or in some cases a preformed soap. We may add an approved food color, and if such color be of oil-soluble type, its adsorption and fixation into the fruit peel is readily accomplished. By the use of a treating agent containing oil-soluble colors or dyes adapted to produce yellow, orange and red shades, the natural varietal color of the fruit may be enhanced and the fruit rendered more uniform in coloring. Furthermore, by inclusion of a water-soluble type of color, a marking action upon cut and abraded fruit may be had, the water-soluble color being absorbed by the damaged areas in a pronounced manner, thereby showing up such fruit for easy detection by the inspector, and making possible accurate elimination of all fruit which might otherwise be susceptible to early break-down. The colors suitable for use are such governmentally-authorized food colors as for instance, annato, alkinet red, carmine 40, 640 tartrazine, 150 orange I, 184 amaranth, 80 ponceau 3R, 10 naphthol yellow S, 773 erythrosin, sunset yellow FCF, ponceau SX, AB yellow (oil Sol) 22, OB yellow (oil Sol) 61, 1180 indigotine, brilliant blue FCF, fast green FCF, 666 guinea green B, 670 light green SF yellow, and any mixtures of these, and any other colors which may be authorized.

I may further incorporate, in the treating agent, a sterilizing agent, as for instance copper soaps, these being copper salts of stearic acid, oleic acid, palmitic acid, and other acids soluble in the naturally occuring oils and waxes in the peel of fruits, or such agent as thymol may be employed. The amount of copper soap for instance, may range from 0.25 to 0.50 percent, or thymol may range in amount from 0.25 to 2.00 percent, etc. as based upon the fundamental oil.

Where water-soluble color is incorporated as a tracer or abrasion-detector, this may be dissolved in the emulsifier or soap solution, as convenient. For such use, water-soluble colors such as brilliant blue are effective, and may be employed in the range of 0.25 to 0.50 per cent as based on the fundamental oil.

To make up a complete formula, including the color, I may proceed by dissolving the oil-soluble color in the fundamental oil, for instance a mineral oil preferably in the lubricating oil range, as for example Red Engine oil, gently heating the oil to promote solution, preferably to approximate saturation. Copper oleate, palmitate or stearate, or thymol or other oil-soluble, decay-retarding agent may be incorporated with another portion of the oil, and the oil solutions of color and of sterilizing agent may then be mixed together, and this may be emulsified in water by means of soaps, as sodium or potassium soaps, or other emulsifying agents, for instance stearic acid or oleic acid and an inorganic base, as an alkali solution, or similar acids in combination with an organic base such as triethanolamine, etc. The emulsion is made up into stock form, and this may then be introduced into the washing tank in a suitable range of dilution, for instance 1:20 to 1:200, and ordinarily about 1:100 of water. The proper diluted emulsion may be applied to the fruit in several ways, as by spraying while on a conveyor, or immersing the fruit in a soaking tank, for two to three minutes, or such other dipping tanks as it may be desirable to use. The facilities of the packing house in which the process is to be used as well as the normal procedure employed in such packing house are taken into consideration so that the process of this invention is adapted with minimum change from normal procedure or equipment.

An example of a desirable formula is:—130 parts of white soap is dissolved in about 1000 parts of water by heating. About 3.5 parts of AB yellow is dissolved in 62.5 parts of mineral oil of 25 to 27° Bé. gravity. About 0.25 parts of copper oleate is dissolved in the oil. All of these are then emulsified together, and the emulsion sets to a thick paste which can be added to the water in the vat used for fruit cleaning, the amount of such stock dilution being, as indicated, generally about 1:50. In the event it is desired that the treating solution also mark abraded, cut or bruised fruit for the purpose of facilitating sorting, about 0.25 parts of water-soluble brilliant blue is dissolved in 437.5 parts of soap solution and this mixture then incorporated into the stock treating agent.

As another example:—A saturated solution of color in oil is made up, for instance, a saturated solution of AB yellow in mineral oil of 25 to 27° Bé. About 3 parts by weight of triethanolamine is mixed with 100 parts of water. About 88 parts by weight of the oil color solution is mixed with about 9 parts of oleic acid in another container, and this is then mixed with the triethanolamine solution and 2 per cent of thymol, with thorough agitation, all being desirably added at once. In use, this may be diluted with water about 1 to 100.

On subjecting the fruit to agitation in a vat of such treating solution, dirt, scales, sooty molds of mealy bug, white fly and other insects, etc. are loosened and removed, and the antiseptic and fungicidal action of the solution takes effect upon the peel, thereby controlling and preventing the germination and growth of fungi in the later course of marketing. The oils of the emulsion adhere to the peel, and when the fruit is removed from the bath, so little water clings to the surface that the fruit dries quickly, and even in damp weather, the drying is vastly simplified as compared with previous practice. The dried fruit presents a high polish or gloss, superior to that obtainable by applications of paraffine for example. Where the water-soluble color has been included, cuts and abrasions in the peel are clearly marked, and on inspection can be sorted out quickly. When an oil-soluble coloring substance or dye is included in the treating agent as described hereinabove, the contact between the treating agent and the fruit causes the coloring agents to become absorbed by or penetrate into the skin or peel of the fruit, thereby imparting an enhanced varietal and natural color to the fruit. When heavy mineral oils are employed in the treating agent, the full development of the varietal color may not take place immediately after such contact but will be reached in the course of about 3 to 12 hours. And for general practice, the inclusion of a small amount of a yellow or red type of coloring material insures that, in the case of citrus fruits, the fruit coming from the treating bath will attain a uniformity and desirability of color not heretofore attainable. Oranges, tangerines, satsumas, mandarins, etc. may thus be quickly and effectively provided with a thorough-going cleaning, polishing and color-uniformizing, which fits in with current packing house equipment and procedure, and facilitates throughput and effectiveness.

Other modes of applying the principle of the invention may be employed, change being made as regards the features herein disclosed, provided the features stated in any of the following claims, or the equivalent of such, be employed.

I therefore particularly point out and distinctly claim as my invention:

1. A process of enhancing the natural varietal color of fresh citrus fruit and simultaneously inhibiting and retarding decay thereof, which comprises contacting whole citrus fruit with an aqueous emulsion containing a carrier miscible with the oily and waxy constituents of the skin or peel of the fruit, said carrier bearing a color material and a decay-retarding agent whereby the skin or peel is caused to absorb color and decay-retarding agent from the carrier.

2. A process of enhancing the natural varietal color of fresh citrus fruit and simultaneously inhibiting and retarding decay thereof, which comprises contacting whole citrus fruit with a carrier miscible with the oily and waxy constitutents of the skin or peel of the fruit, said carrier having a coloring material and a decay-inhibiting material in solution therein whereby the skin or peel of the fruit is caused to absorb color and decay-inhibiting material from the carrier.

RODNEY B. HARVEY.